United States Patent
Jaeger et al.

(10) Patent No.: US 6,650,346 B1
(45) Date of Patent: Nov. 18, 2003

(54) METHOD AND APPARATUS FOR CLASSIFYING EQUIPMENT IN ASSET MANAGEMENT DATABASE

(75) Inventors: John G. Jaeger, Flower Mound, TX (US); Peggy J. Dorman, Grand Prairie, TX (US); Michael C. Jones, Nashville, TN (US); Thomas G. Cooper, Franklin, TN (US)

(73) Assignee: GE Medical Technology Services, Inc., Waukesha, WI (US)

( * ) Notice: Subject to any disclaimer, the term of this patent is extended or adjusted under 35 U.S.C. 154(b) by 403 days.

(21) Appl. No.: 09/620,696

(22) Filed: Jul. 20, 2000

(51) Int. Cl.$^7$ .......................... G09G 5/00; G06F 17/60; G06F 17/00

(52) U.S. Cl. .................. 345/764; 345/968; 705/28; 707/102

(58) Field of Search ................... 345/968, 764, 345/765, 780, 781; 707/102, 1, 3, 100; 705/28

(56) References Cited

U.S. PATENT DOCUMENTS

| | | | | |
|---|---|---|---|---|
| 6,098,050 A | * | 8/2000 | Knoblock et al. | 705/28 |
| 6,192,325 B1 | * | 2/2001 | Piety et al. | 702/184 |
| 6,430,536 B2 | * | 8/2002 | Irving et al. | 705/2 |
| 6,464,133 B1 | * | 10/2002 | Gruber | 235/375 |

OTHER PUBLICATIONS

A & D Medical Products Website. 1999. http://web.archive.org/web/20011021231506/www.andmedical.com/products/products.htm?mcart_ID=566937619&createCookie=yes&.*

* cited by examiner

Primary Examiner—John Cabeca
Assistant Examiner—Brian Detwiler
(74) Attorney, Agent, or Firm—Ostrager Chong & Flaherty LLP

(57) ABSTRACT

Method and apparatus inputting information identifying and classifying an article in an asset management database. A graphical user interface has a first screen showing a search field and a display window. A reference database has records, each record containing manufacturer, model and article type information for a respective class of articles. In response to the input of a manufacturer query in the search field, a list of entries is displayed in the display window. Each entry includes the same manufacturer identifier, a different model number, and one of multiple article types derived from the reference database. In response to selection of one of the list entries, a second screen appears having an empty data field for entry of an article identifier identifying an article made by a manufacturer identified by the manufacturer identifier and having the model number for the selected entry, and filled data fields containing the manufacturer identifier, model number and article type for said selected entry. The manufacturer identifier, model number and article type for the selected entry are stored in an asset management database in association with the article identifier in response to activation by the data entry person.

10 Claims, 7 Drawing Sheets

Site Brentwood IT: Install Part: Select Part Filter — 28

Find By:
Make: COR  ▼ ☑ Show Revisions — 32
Part No: [____] ▼ All  [✎]  [Find] — 34

| Part No | Description | Make | Model No | Part St | Rev | Line | Family | Domain | Rev E |
|---|---|---|---|---|---|---|---|---|---|
| COROME/5562 | Press Meas Unit/Direct Mod | Corometrics Medical Systems | 5562 | Active | | | | Equipm | Active |
| COROME/3211322 | Telemetry Units. Ecg. Rcvr/Tx | Corometrics Medical Systems | 3211322 | Active | | | | Equipm | Active |
| COROME/0341AAN-523-534 | Telemetry Units. Ecg. Rcvr/Tx | Corometrics Medical Systems | 0341AAN-523-534 | Active | | | | Equipm | Active |
| COROME/5564 | Oximeter/Pulse | Corometrics Medical Systems | 5564 | Active | | | | Equipm | Active |
| COROME/4158 | Fetal Monitor | Corometrics Medical Systems | 4158 | Active | | | | Equipm | Active |
| ▶ COROME/150 | Fetal Monitor | Corometrics Medical Systems | 150 | Active | | | | Equipm | Active |
| COROME/151 | Fetal Monitor | Corometrics Medical Systems | 151 | Active | | | | Equipm | Active |
| COROME/155 | Fetal Monitor | Corometrics Medical Systems | 155 | Active | | | | Equipm | Active |
| COROME/220 | Fetal Monitor, Ph | Corometrics Medical Systems | 220 | Active | | | | Equipm | Active |
| COROME/120 | Fetal Monitor | Corometrics Medical Systems | 120 | Active | | | | Equipm | Active |
| COROME/147 | Fetal Hrt Dectr. Ultrason | Corometrics Medical Systems | 147 | Active | | | | Equipm | Active |
| COROME/340 | Telemetry Units. Ecg. Rcvr/Tx | Corometrics Medical Systems | 340 | Active | | | | Equipm | Active |
| COROME/415C | Fetal Monitor | Corometrics Medical Systems | 415C | Active | | | | Equipm | Active |
| COROME/115 | Fetal Monitor | Corometrics Medical Systems | 115 | Active | | | | Equipm | Active |
| COROME/340R | Telemetry Units. Ecg. Rcvr/Tx | Corometrics Medical Systems | 340R | Active | | | | Equipm | Active |
| COROME331 | Telemetry Units. Ecg. Rcvr/Tx | Corometrics Medical Systems | 331 | Active | | | | Equipm | Active |
| COROME/340T | Telemetry Units. Ecg. Rcvr/Tx | Corometrics Medical Systems | 340T | Active | | | | Equipm | Active |

36

[Use/Done]  [New]  [Open] — 38  [Delete]  [Done]

Ready    Site (1) Brentwood IT    11:47 AM

Site Brentwood IT: COROME/150

- Part Number: COROME/150 | Prev.
- Make: Corometrics Medical Systems
- Model No: 150
- Description: Fetal Monitor
- Control No:
- Serial No/Qty:
- Part No/Rev: COROME/150
- Billable Type: Regular Billable
- Acquisition Method: Purchased
- Acquisition Vendor:
- Acquisition Date: ?/?/? ?:??
- Install Date: ?/?/? ?:??
- Coverage Start Date: ?/?/? ?:??
- Warr End Date: ?/?/? ?:??
- Retire Date: ?/?/? ?:??
- Retire Reason: None
- Risk Level: 2

Equipment: New MM

- Domain:
- Type:
- Status: In Service
- Owning Department: 113130/Parkland
- Using Department: 113130/Parkland
- Facility Asset Number:
- Location:

PM
- PM Mandatory: ON
- Major PM Interval: 0
- Major PM Period: Month
- Major PM DueDate: ?/?/? ?:??
- Minor PM Interval: 0
- Minor PM Period: Month
- Minor PM DueDate: ?/?/? ?:??
- PM Procedure: 550

More Info  Done

Install/Select   Previous
Install/Done     Next      Replace

Ready   Site (1) Brentwood IT    11:48 AM

FIG. 6

| HOSPITALS | COMMON DEVICES | | | | |
|---|---|---|---|---|---|
| | ANESTHESIA DEVICES | DEFIBRILLATORS | INFUSION PUMPS | PATIENT MONITORS | VENTILATORS |
| ST. A | 12 | 12 | 182 | 24 | 14 |
| ST. B | 11 | 13 | 122 | 24 | 14 |
| MEMORIAL GEN | 28 | 38 | 498 | 66 | 12 |
| COMMUNITY HOSP. | 14 | 36 | 178 | 50 | 10 |
| MARKET A TOTAL | 65 | 99 | 990 | 164 | 50 |
| ST. C | 29 | 60 | 328 | 89 | 23 |
| ST. D | 8 | 25 | 86 | 33 | 20 |
| MEMORIAL II | 34 | 75 | 465 | 109 | 62 |
| GREATER COMMUNITY | 24 | 82 | 261 | 106 | 22 |
| VHA 1 | 25 | 63 | 675 | 88 | 31 |
| MARKET B TOTAL | 120 | 305 | 1865 | 425 | 158 |
| ST. E | 19 | 42 | 159 | 61 | 29 |
| ST. F | 8 | 20 | 92 | 28 | 17 |
| MEMORIAL III | 25 | 30 | 251 | 55 | 20 |
| ST.Z | 6 | 23 | 135 | 29 | 13 |
| ST.X | 11 | 44 | 122 | 35 | 7 |
| GOTHAM GENERAL | 21 | 47 | 322 | 68 | 25 |
| SMALLVILLE GENERAL | 14 | 26 | 152 | 40 | 44 |
| STARFLEET GENERAL | 4 | 16 | 67 | 20 | 3 |
| ST.Y | 6 | 19 | 51 | 25 | 5 |
| ST.W | 12 | 34 | 191 | 46 | 25 |
| METROPOLIS GENERAL | 8 | 13 | 111 | 21 | 17 |
| ST.V | 17 | 53 | 220 | 70 | 21 |
| ST.Q | 15 | 26 | 143 | 41 | 15 |
| MARKET C TOTAL | 166 | 393 | 2046 | 559 | 241 |
| ALL SAMPLE MARKETS | 357 | 797 | 4891 | 1148 | 449 |

METHOD AND APPARATUS FOR CLASSIFYING EQUIPMENT IN ASSET MANAGEMENT DATABASE

FIELD OF THE INVENTION

This invention relates generally to centralized generation of reports which compile and/or summarize inventory information stored in a database. In particular, the invention relates to systems and methods for automatically classifying equipment tracked in a database accessible by a computer.

BACKGROUND OF THE INVENTION

A system for tracking biomedical equipment at a multiplicity of medical facilities has been proposed. In accordance with that proposal, biomedical inventories at a multiplicity of sites will be fed into one centralized database. The inventory information in the database can be processed to generate reports, such as tables and charts, which reports can then be placed on a web server and accessed via a wide area network, e.g., the Internet, by authorized personnel at remote sites, e.g., hospital administrators. The administrators can then use these reports to expedite management of service delivery, asset tracking and asset leveling (i.e., purchasing, renting, etc.).

The proposed multi-site asset management system will be capable of producing reports for individual sites as well as for multiple sites (such as a hospital system). For example, a report can be generated which lists the number of devices of particular types in the inventory of various hospitals belonging to one customer. Alternatively, the devices in inventory can be grouped by modality and/or submodality, the number of devices of each modality/submodality being listed for each hospital. Such inventory listings may be enhanced by the inclusion of various benchmarks, for example, the number of devices of a particular type per operating room or hospital bed for each hospital. Such reports can facilitate asset management by a customer having multiple sites equipped with a multiplicity of types of devices.

The proposed system can also generate charts and tables which show the distribution of the devices of a particular type by manufacturer and model. Such charts and tables can be generated for a particular hospital or a group of hospitals owned by a particular customer. In addition, charts may be generated which display a measured parameter, e.g., average number of breakdowns per maching or mean time between failures, indicative of the relative reliabilities of devices made by different manufacterers. Such reports can provide the customer with a sound basis for making purchase decisions, i.e., which manufacturer to purchase equipment from.

In view of the reliance to be placed on reports summarizing the biomedical equipment in inventory, it is critical that the data input to the system from the hospitals be correct. Correct information cannot be disseminated from a central location unless the data input to the central database is accurate. In a known computerized asset management system, when new equipment is entered into the database, the data entry person is presented with a free-form text field for insertion of the model number with no standardization. [As used herein, the term "model number" means any alphanumeric designation which identifies a particular model manufactured by a particular manufacturer and is not limited to include only numbers. In particular, a model number can be a model name having no numbers.]

Consequently, data entry personnel may introduce errors (e.g., misspellings) and different data entry persons may adopt varying text to identify the same model number or may introduce punctuation differences. Data entry variances may also arise due to the various ways in which numbers can be expressed, e.g., spelled numbers (e.g., "six") versus Roman numerals (e.g., VI) versus Arabic numbers (e.g., "6"). Also one data entry person might enter a Greek lower-case letter (e.g., "β"), while another might spell-out the letter (e.g., "beta"), in attempting to enter the same model number. A conventional asset management system is unable to recognize nonstandard model numbers and therefore will be unable to retrieve all relevant data from the database in response to a request that the data for devices having a standardized model number be retrieved from the database.

Further, the conventional asset management system allows each identified piece of equipment to be categorized by entering a device type code. For example, in the case of biomedical equipment, some common device types include the following examples: anesthesia machines, defibrillators, infusion pumps, patient monitors and ventilators. Each piece of equipment is thus classified by manufacturer, model number and device type in the database. However, to be able to categorize a piece of equipment as belonging to a particular device type requires the data entry person to have knowledge of the equipment features and/or capabilities which characterize each device type and knowledge of the corresponding features and/or capabilities of the equipment being categorized, as well as a certain level of analytical skill. Since such knowledge and analytical skill vary from person to person, naturally such a system is susceptible to the input of erroneous device type codes in the centralized database. Again the presence of such erroneous information in the database will result in inaccurate reports based on device type.

Thus there is a need for a method and a system for entering standardized equipment classification data into a centralized database of an asset management system.

SUMMARY OF THE INVENTION

The present invention is directed to a method and an apparatus for providing standardized classification of equipment, such as biomedical devices, in an asset (or inventory) management database for inventory analysis and benchmarking. When new equipment is entered into a database, the data entry person will select a predefined manufacturer and model number combination. This will ensure standardized identification of the equipment and proper assignment of a device type code to ensure correct pricing, to minimize maintenance requirements and to facilitate staff skills assessment. By changing the way model numbers are entered in the centralized database from free-form text to a predefined selection or pick list, the model numbers are standardized. In addition, the pick list includes device types associated with the model numbers. Thus when a pick list entry having the desired model number is selected, the corresponding device type code is automatically assigned and included in the database. New manufacturer/model combinations will be checked by a data quality analyst prior to addition to the system to maintain data integrity.

In accordance with the preferred embodiment of the invention, a graphical user interface is used to select classification data from a pick list displayed in a window on a screen. The screen also has a search field which the data entry person fills with a manufacturer query, e.g., the first three letters of the manufacturer's name. A reference database has records, each record containing manufacturer, model and article type information for classes of articles manufactured by a multiplicity of manufacturers. In response to initiation of a search for the manufacturer specified in the search field, the reference database is searched for all models manufactured by that particular manufacturer. A pick list of the different model names is displayed in the display window on the screen. Each entry includes the same manufacturer identifier, a different model number, and one of multiple article types derived from the reference database. The data entry person can simply click on the entry corresponding to the article to be classified.

In accordance with the preferred embodiment of the invention, in response to selection of an entry from the pick list, a second screen appears having a multiplicity of empty data fields to be filled in by the data entry person and a multiplicity of filled data fields containing the manufacturer identifier, model number and article type from the selected entry. One of the empty data fields is filled in by the date entry person with an article identifier (e.g., a machine serial number) identifying the article being classified (which article has the model number in the selected pick-list entry). The manufacturer identifier, model number and article type for the selected entry are stored in an asset management database in association with the entered article identifier in response to activation by the data entry person. This process is repeated for each article to be tracked by the system, thereby constructing a database which can be used to track assets and make equipment purchase decisions. In particular, inventory and other types of reports can be generated for assets of one or more article type.

In accordance with the disclosed preferred embodiment, the articles being tracked or inventoried are biomedical devices used by hospitals. Digital information characterizing and classifying the assets for a multiplicity of customers owning hospitals and/or other medical facilities are stored in a centralized database. For each model (i.e., class of articles) manufactured by a particular manufacturer, the database contains the manufacturer's name, the model number, a device type to which the model belongs, a submodality to which the device type belongs, a modality to which the submodality belongs, and a device description corresponding to the device type. Modality groups join equipment with similar functions for repair skills requirements, service level pricing differences and marketing analysis. Submodality groups allow a finer grouping of equipment for inventory analysis and asset management benchmarking. As inventory is added to the database, device type codes of similar types of equipment are automatically assigned to modality and submodality groups. Data on this equipment may then be retrieved from these modality or submodality groups for analysis and benchmarking. Reports can be generated which compile and/or summarize inventory data for one or more device types, for one or more submodalities, or for one or more modalities.

The various device classes (i.e., device type, submodality and modality) are prestored in standardized nomenclature in association with the model number. This process is automated and the relationships between device types and modality/submodality groups are predefined and will remain consistent. Errors from omitting a device type or including an unrelated device type in an analysis will be eliminated.

BRIEF DESCRIPTION OF THE DRAWINGS

FIG. 2 is a representation of a graphical user interface screen which is displayed in response to selection of a customer site in accordance with the preferred embodiment of the invention.

FIG. 3 is a representation of a graphical user interface screen which is displayed in response to clicking on a virtual Configuration Manager button in the screen shown in FIG. 2 in accordance with the preferred embodiment of the invention.

FIG. 4 is a representation of a graphical user interface screen, having a Make search field and a pick list display window, which is displayed after a virtual Install button in the screen shown in FIG. 3 has been clicked on.

FIG. 5 is a representation of a graphical user interface template which is displayed after an entry has been picked from the model number list and a virtual Open button in the screen shown in FIG. 4 has been clicked on.

FIG. 6 is a representation of a tabular report which can be generated based on device type data retrieved from a centralized database.

DETAILED DESCRIPTION OF THE PREFERRED EMBODIMENTS

Figure 1:
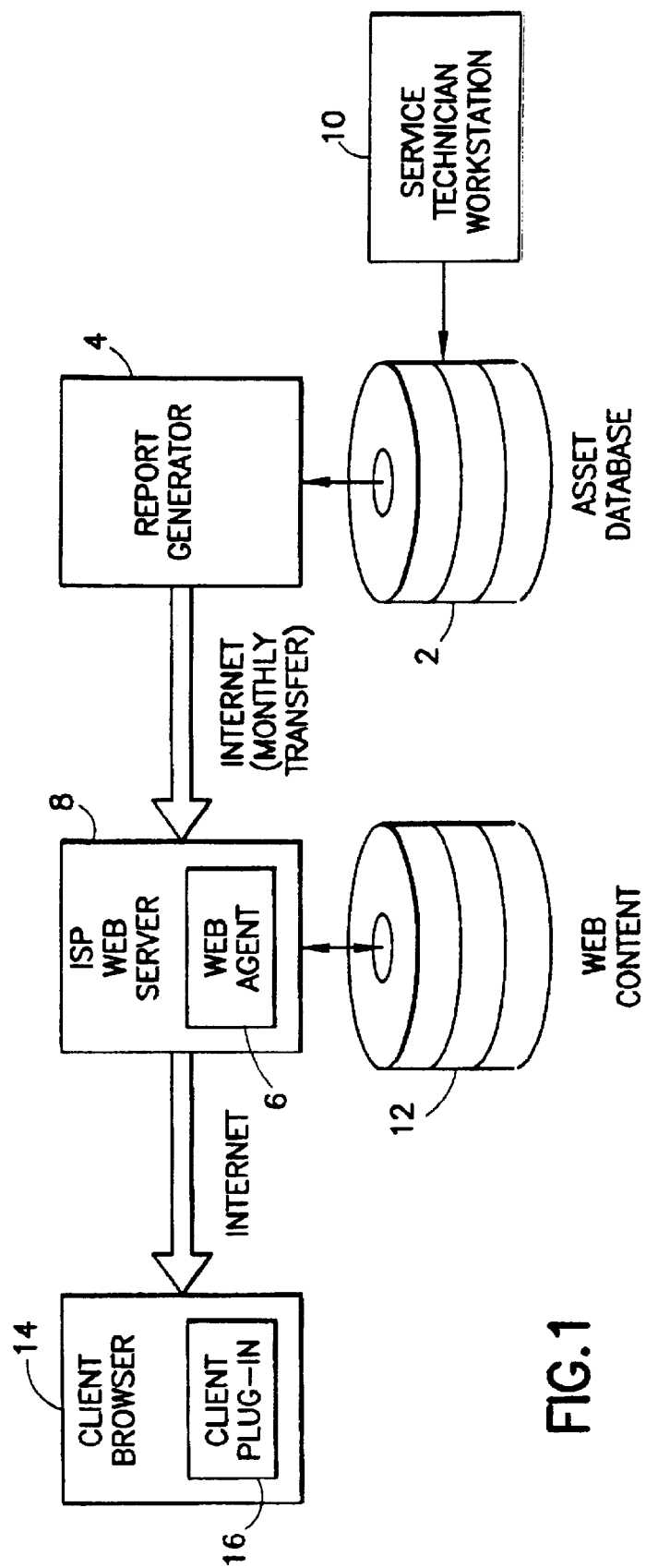
FIG. 1 is a block diagram showing a web-based asset management system whereby customers owning equipment may obtain inventory and other reports generated from data in a centralized asset database.

The present invention relates to a process by which data is gathered into a centralized database for asset management of an inventory of articles, such a biomedical equipment. FIG. 1 is a block diagram showing a web-based asset management system whereby customers owning equipment may obtain inventory and other reports generated from data in the centralized database. This asset management system comprises an asset database 2 of inventory data, a report generation system 4, and a web agent 6 and a web server 8 for delivery of the reports to clients. The asset database comprises an aggregation of asset information from remotely located customer sites, input to the database via one or more service technician workstations 10. The report generation system 4 preferably comprises a report server programmed with a report generation toolkit. The information in database 2 is queryable using the report generation toolkit to produce formatted reports, such as those shown in FIGS. 6 and 7 (described in some detail later). The report generator 4 creates all reports for all hospital in the system. Typically, reports will be generated once per month per hospital.

All information is delivered to the customer via the Internet from the web server 8 of an Internet service provider. There are two kinds of information delivered: HTML (web page) content and text file downloads of tab-delimited database information. Login username/password security controls access permissions to the web pages, and is also used to select the appropriate dataset(s) and levels of access for the user. Security access will regulate whether the user has access to a single site or site groups.

The web agent 6 works in conjunction with the web server 8. The web agent 6 is responsible for interpreting the web page content that is generated by the report generator 4 and converting the content to HTML. The web agent 6 also acts as an intermediary between the web user and the report data stored in the web content database 12. The web agent 6 executes on the web server 8. The web server 8 establishes the necessary connectivity between the socket connection 16 of the user's browser 14 at a remote location and the web page content (reports) in database 12. The web server is configured to recognize HTTP requests for web agent content as well as normal HTML file content retrievals. The web server 8 has the ability to download tab-delimited text files intended for incorporation into a site's financial system.

In accordance with the preferred embodiment of the invention, the service technician workstation 10 is programmed with software for entering asset data into the centralized asset database. This software comprises a reference database containing a listing of standardized model numbers or names for each equipment manufacturer. For each model (i.e., class of articles) manufactured by a particular manufacturer, the reference database contains the manufacturer's name, the model number, a device type to which the model belongs, a submodality to which the device type belongs, a modality to which the submodality belongs, and a device description corresponding to the device type. Only standardized forms for each of these fields are entered in the reference database. The service technician or other data entry person can select predefined information from the reference database without introducing errors or variances in terminology or classification of the equipment. The screens used for entering, in the centralized database, standardized information for an article of equipment owned by a customer and residing at a remote location, e.g., a hospital owned by that customer, are shown in FIGS. 2–5.

Figure 2:
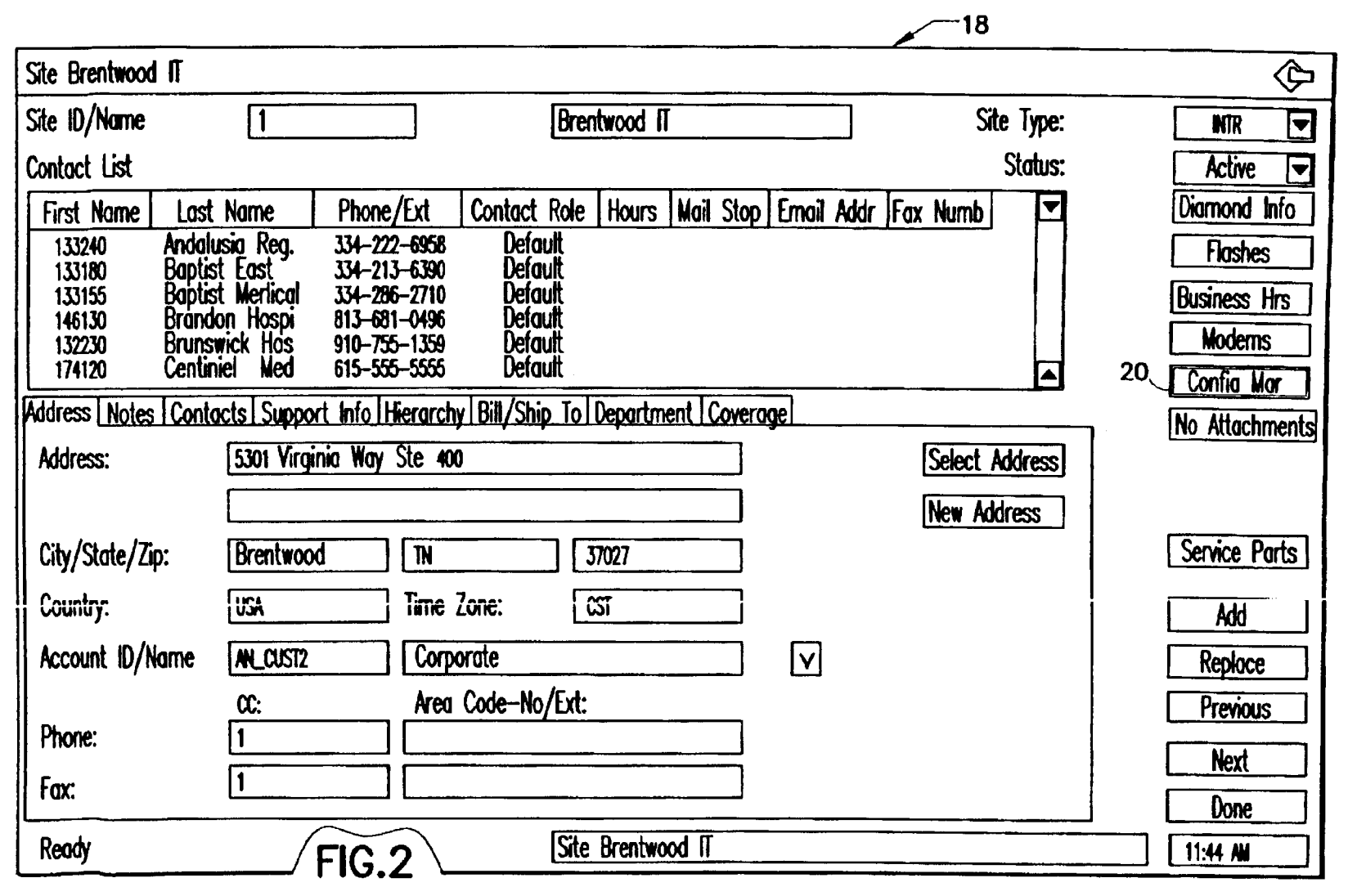
Figure 3:
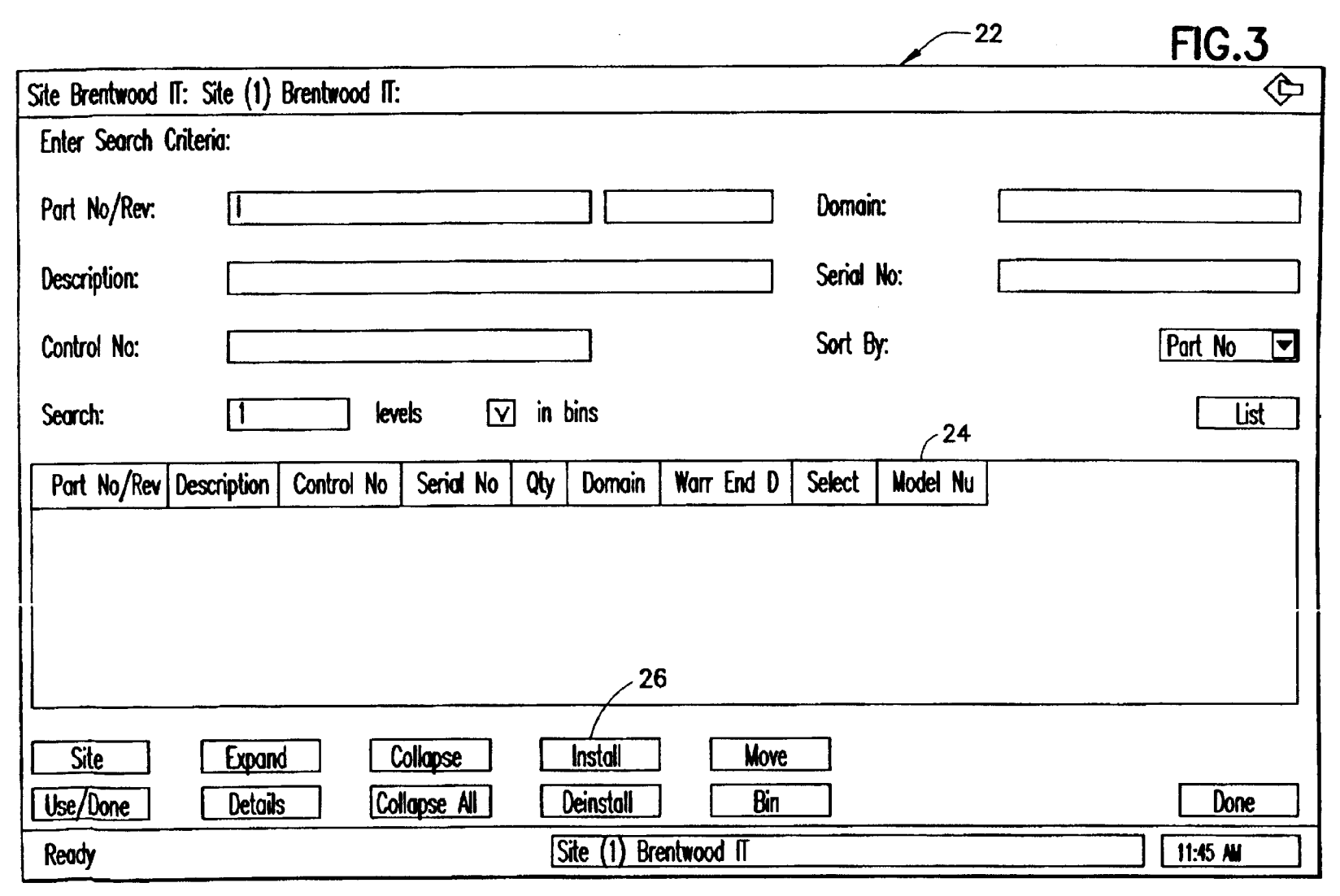

After the data entry person has logged in and selected the site (from a pick list of sites) where the equipment to be classified resides, the screen 18 shown in FIG. 2 is displayed on the display monitor at workstation 10. Screen 18 displays information concerning the site, which in this example is a site named Brentwood IT. The only portion of screen 18 which is relevant to the present invention is a virtual Configuration Manager button 20. In response to the data entry person clicking on the Configuration Manager button 20 (e.g., by placing a visual indicator over the area 20 on the screen by moving a mouse on a pad and then clicking a button on the mouse in conventional manner), the screen 22 shown in FIG. 3 appears. Screen 22 can be used to enter search criteria for retrieving asset data for equipment at a particular site from the asset database. The retrieved data is displayed as a list in window 24. The portion of screen 22 which is relevant to the present invention is a virtual Install button 26 which is selected by the data entry person when new equipment is to be added to the asset database. In response to the data entry person clicking on the Install button 26, a screen 28 shown in FIG. 4 appears, except it should be understood that the Make search field 30 and the display window 32 are initially blank when the screen appears. FIG. 4 shows the state of screen 28 after the following sequence of operations have been performed by the data entry person. First, the data entry person queries the reference database by typing in the first few (e.g., 3) letters of the name of the manufacturer (i.e., Make) of the equipment being added to the asset database in the Make search field 30 using an operator input interface, e.g., a computer keyboard. Then the data entry person clicks on a virtual Find button 34 on screen 28 to bring up a list of all model numbers for the manufacturer specified by the query. As shown in FIG. 4, the displayed list comprising a multiplicity of entries retrieved from the reference database, one entry for each different model of equipment made by the specified manufacturer. Each entry comprises the following columns: a Part No. column containing the part number (which is a composite of a portion of the manufacturer's name and the model number) of the device; a Description column containing a description of the class or type of device; a Make column containing the full name of the manufacturer of the device; a Model No. column containing the model number of the device; and other columns not relevant to the present invention.

Instead of being required to enter the model number in a free-form text field, the data entry person can select the model number of the equipment or device being classified by simply clicking on the appropriate entry in the pick list shown in the display window 32. The shaded row 36 in FIG. 4 represents a list entry which has been selected by the data entry person. At the same time, the associated device description is being selected. Although not displayed on the pick list, other data associated with the selected model number in the reference data will also be included in the record to be stored in the asset database. The other associated data includes the device type code corresponding to the device description, the submodality to which the device type belongs and the modality to which the submodality belongs. After entry 36 has been selected, the data entry clicks on a virtual Open button 38 on screen 28.

In response to the data entry person clicking on the Open button 38, a template 40 (shown in FIG. 5) appears on the display monitor in place of screen 28 shown in FIG. 4. The displayed template 40 has a multiplicity of empty data fields to be filled in by the data entry person and a multiplicity of preloaded data fields containing some of the predefined information retrieved from the reference database as previously described. In the former category is the Serial No. data field 42 for entry of the serial number of the particular piece of equipment being added to the database. Other empty data fields are provided for service coverage, warranty and preventive maintenance information. In the latter category, the part number is preloaded in the Part Number data field 44; the make and model number are preloaded in the Make and Model No. data fields 46 and 48, respectively; and the device type description is preloaded in Description data field 50. After the data entry person has entered all other available and appropriate information into the empty data fields, a click on a virtual Done button 52 causes all of the information appearing in the template to be included in a record which is loaded into the asset database 2 (see FIG. 1). In accordance with the preferred embodiment of the invention, the device type code, the modality code and the submodality code associated with the piece of equipment being added to the asset database may be stored in the same record in the asset database or in a separate record linked to the first record. In either case, every piece of equipment in the system will have a machine serial number, a make, a model number, a device description, a device type, a submodality and a modality associated therewith in the asset database. In accordance with the preferred embodiments, the model number is picked from a prestored list, and the picked model number has predefined device type, submodality and modality associated therewith. Presented with the task of simply making one selection from a predefined list, one or more classification fields can be filled in automatically with no chance that the data entry person will introduce any error or variance. These classification fields can then be used to retrieve information from a centralized database for reports on equipment generated for customers.

Figure 7:
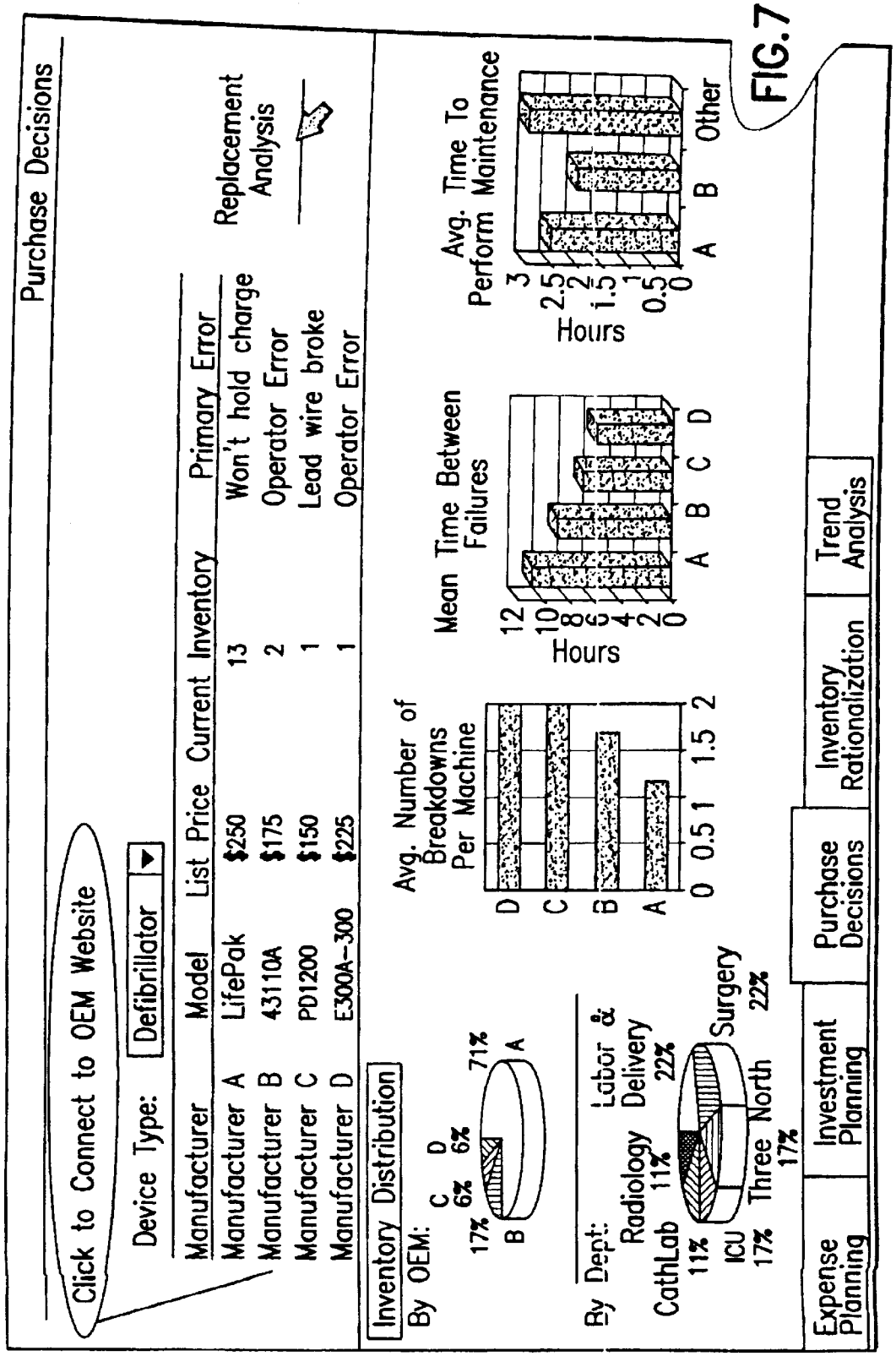
FIG. 7 is a representation of a composite report, including a table and charts, which can be generated based on device type data retrieved from a centralized database.

FIGS. 6 and 7 show examples of reports which can be provided to customers based on classified equipment information in a centralized database. FIG. 6 shows part of a web page which can be viewed by a customer via the Internet. Typically, the downloaded web page will include a display window and a multiplicity of navigation tabs. FIG. 6 represents a display window with a tabular report displayed therein. The particular table shown in FIG. 6 comprises a listing of the numbers of different biomedical devices owned by various hospitals owned by one customer, the devices being grouped as a function of device type, with one column for each device type. FIG. 7 shows another type of report which can be generated by the report generator and placed on the Internet for viewing by authorized personnel of a customer. The composite report shown in FIG. 7 includes a table listing a customer's inventory of a particular type of device, namely, defibrillators, as a function of manufacturer and charts which present equipment performance information for this device type as a function of manufacturer. Such a report can aid a buyer in making decisions concerning which equipment to purchase based on past performance of similar equipment. Reports similar to those shown in FIGS. 6 and 7 can be generated as a function of modality and/or submodality classification, which are used to group similar devices for asset management, training and part sourcing. In particular, information organized according to device type, submodality or modality can also be used to provide benchmarking reports.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "model number" means any designation for identifying a particular model, and includes, but is not limited to numeric, alphabetic (e.g., model names) and alphanumeric designations; and the term "article" means any mass-produced article of manufacture having a model number or model name. The present invention is not limited in its application to management of an inventory of biomedical devices, but may also be applied to inventories of automobiles, appliances, furniture, computer equipment, etc.

What is claimed is:

1. A system for inputting information identifying and classifying an article in a database, comprising
    a graphical user interface comprising a first screen, said first screen comprising a search field and a display window;
    a reference database comprising a first multiplicity of records, each record of said reference database containing manufacturer, model and article type information for a respective class of articles and not containing article identifiers that uniquely identify any particular article belonging to any class of articles;
    an asset management database comprising a second multiplicity of records, each record of said asset management database containing manufacturer, model, article type, and article identifier information for a respective article, each article identifier uniquely identifying each article in an inventory;
    means for inputting a search word comprising a sequence of alphanumeric characters uniquely identifying a particular manufacturer in said search field on said first screen;
    means for displaying a list of entries in said display window on said first screen in response to input of said search word, each of said entries comprising a manufacturer identifier identifying said particular manufacturer, a different model number representing respective models of equipment manufactured by said particular manufacturer, and a respective designation identifying one of a multiplicity of article types by which said respective model of equipment is classified, all of said information being retrieved from said reference database; and
    means for selecting one of said entries listed in said display window,
    wherein said graphical user interface changes from said first screen to a second screen in response to said selection of said one of said entries, said second screen comprising an empty data field for entry of an article identifier uniquely identifying an article made by said particular manufacturer and having the model number for said selected entry, filled data fields containing the manufacturer identifier, model number and article type for said selected entry, and an activation area that is selectable by said selecting means, and
    wherein said system further comprises means for creating a new record containing the information appearing in said fields on said second screen at the time when said activation area is selected after entry of said article identifier and storing said new record in said asset management database.

2. The system as recited in claim 1, wherein said second screen comprises other empty data fields for entry of other article information for said article identified by said article identifier, said other article information being stored in said asset management database in association with said article identifier in response to selection of said activation area via said selecting means.

3. The system as recited in claim 1, wherein said activation area comprises a virtual button.

4. The system as recited in claim 1, wherein said graphical user interface further comprises a movable visual indicator, and said selecting means comprise an input device for controlling the position of said visual indicator on said first screen.

5. The system as recited in claim 4, wherein said input device comprises a mouse.

6. A system comprising:
    a display monitor;
    software for displaying a graphical user interface on said display screen, said graphical user interface comprising a first screen comprising a search field and a display window;
    an operator input interface;
    a reference database comprising a first multiplicity of records, each record of said reference database containing manufacturer, model and article type information for a respective class of articles and not containing article identifiers that uniquely identify any particular article belonging to any class of articles;
    an asset management database comprising a second multiplicity of records, each record of said asset management database containing manufacturer, model, article type, and article identifier information for a respective article, each article identifier uniquely identifying each article in an inventory;
    software for controlling said display monitor to display a list of entries in said display window in response to input of a search word comprising a sequence of alphanumeric characters uniquely identifying a particular manufacturer in said search field on said first screen via said operator input interface, each of said entries comprising a manufacturer identifier identifying said particular manufacturer, a different model number representing respective models of equipment manufactured by said particular manufacturer, and a respective designation identifying one of a multiplicity of article types by which said respective model of equipment is classified, all of said information being retrieved from said reference database; and software for selecting one of said entries listed in said display window in response to input of an entry selection via said operator input interface, wherein said graphical user interface changes from said first screen to a second screen in response to said selection of said one of said entries, said second screen comprising an empty data field for entry of an article identifier uniquely identifying an article made by said particular manufacturer and having the model number for said selected entry, filled data fields containing the manufacturer identifier, model number and article type for said selected entry, and an activation area that is selectable via said operator input interface, and wherein said system further comprises software for creating a new record containing the information appearing in said fields on said second screen at the time when said activation area is selected after entry of said article identifier and storing said new record in said asset management database in response to selection of said activation area, said entry in said empty data field being treated as an article identifier of the article to be classified.

7. The system as recited in claim 6, wherein said second screen comprises other empty data fields for entry of other article information for said article identified by said article identifier, said other article information being stored in said asset management database in association with said article identifier in response to selection of said activation area via said operator input interface.

8. A system comprising:
a display monitor;
an operator input device;
memory storing a reference database comprising a multiplicity of records, each record containing manufacturer, model and article type information for a respective class of articles and not containing article identifiers that uniquely identify any particular article belonging to any class of articles; and
a computer programmed to perform the following steps:
controlling said display monitor to display a graphical user interface on said display screen, said graphical user interface comprising a first screen comprising a search field and a display window;
controlling said display monitor to display a list of entries in said display window in response to input of a search word comprising a sequence of alphanumeric characters uniquely identifying a particular manufacturer in said search field via said operator input device, each of said entries comprising a manufacturer identifier identifying said particular manufacturer, a different model number representing respective models of equipment manufactured by said particular manufacturer, and a respective designation identifying one of a multiplicity of article types by which said respective model of equipment is classified, all of said information being retrieved from said reference database;
controlling said display monitor to visually indicate a selected one of said entries listed in said display window in response to input of an entry selection via said operator input interface;
controlling said display monitor to change said graphical user interface from said first screen to a second screen following the input of said entry selection, said second screen comprising an empty data field for entry of an article identifier uniquely identifying an article made by said particular manufacturer and having the model number for said selected entry, and filled data fields containing the manufacturer identifier, model number and article type for said selected entry; and
loading said manufacturer identifier, said model number and said article type in association with said article identifier in an asset management database in memory in response to input of a load data command via said operator input device.

9. The system as recited in claim 8, wherein said second screen comprises other empty data fields for entry of other article information for said article identified by said article identifier, said computer being further programmed to store said other article information in said asset management database in association with said article identifier in response to input of said load data command via said operator input interface.

10. A method for adding a record identifying and describing an article having a unique article identifier to an asset management database containing digital data, comprising the following steps:

determining the manufacturer and model number of said article;

inputting a search word comprising a sequence of alphanumeric characters uniquely identifying the particular manufacturer of said article in a search field on a first screen of a graphical user interface;

displaying a pop-up pick list on said first screen in response to said inputting step, said pick list comprising a list of entries, each of said entries comprising a manufacturer identifier identifying said particular manufacturer, a different model number representing respective models of equipment manufactured by said particular manufacturer, and a respective designation identifying one of a multiplicity of article types by which said respective model of equipment is classified, wherein none of said entries includes an article identifier uniquely identifying said article;

interacting with said graphical user interface to select the one of said listed entries that identifies the model number of said article;

displaying a second screen in response to said selection of said one of said entries, said second screen comprising an empty data field for entry of an article identifier uniquely identifying said article, filled data fields containing the manufacturer identifier, model number and article type for said selected entry, and an activation area that is selectable by said selecting means;

interacting with said graphical user interface to enter said article identifier of said article in said empty data field and then select said activation area; and storing in said asset management database a new record containing the information appearing in said fields on said second screen at the time when said activation area is selected, said new record comprising the manufacturer identifier, the model number, the article identifier and the article type for said article.

* * * * *